(12) United States Patent
Villa et al.

(10) Patent No.: US 7,379,735 B2
(45) Date of Patent: May 27, 2008

(54) RAPID PUSH-TO-TALK CALL SETUP METHOD AND APPARATUS

(75) Inventors: Fred R. Villa, Gilbert, AZ (US); Keith M. Klug, Mesa, AZ (US); Glen S. Uehara, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 337 days.

(21) Appl. No.: 11/216,360

(22) Filed: Aug. 31, 2005

(65) Prior Publication Data

US 2007/0049312 A1    Mar. 1, 2007

(51) Int. Cl.
*H04Q 7/20* (2006.01)

(52) U.S. Cl. .................. 455/426.1; 455/552.1

(58) Field of Classification Search ........ 455/518, 455/519, 521, 426.1, 552.1; 370/335
See application file for complete search history.

(56) References Cited

U.S. PATENT DOCUMENTS

2004/0121791 A1  6/2004  May et al.
2004/0203469 A1* 10/2004 Patel et al. ............. 455/67.14
2004/0218555 A1  11/2004 Chen et al.
2004/0219940 A1  11/2004 Kong et al.
2005/0014506 A1  1/2005  Thorson et al.
2005/0085253 A1*  4/2005 Mansour ................ 455/519

* cited by examiner

*Primary Examiner*—Edward F. Urban
*Assistant Examiner*—Tu Nguyen

(57) ABSTRACT

A system (20) of establishing a rapid PTT call setup in a multi-wireless network environment, can include a first wireless network (24 and 26) such as an iDEN network optimized for rapid push-to-talk call setups in typically less than one second and a second wireless network (23 and 27) such as a CDMA wireless network operatively coupled to the first wireless network. The system can further include a communication protocol among an originating mobile subscriber unit (22), a target mobile subscriber unit (28), the first wireless network, and the second wireless network, where the first wireless network and the second wireless network receive a request for a PTT session and the PTT session is set up on the second wireless network using the first wireless network. The system can further include a PTT server (25) operatively coupled to the first wireless network and the second wireless network.

21 Claims, 5 Drawing Sheets

| Mobile | LOG Time | Description | Relative Time (seconds) |
|---|---|---|---|
| 2 | 18:31:25.714 | first indication of call starting | 0.000 |
| 2 | 18:31:25.916 | _PTT indicate that call started send INVITE | 0.202 |
| 2 | 18:31:27.632 | CDMA modem going to Update Ovrhd Info State | 1.918 |
| 2 | 18:31:27.667 | CDMA modem going to Origination Attempt State | 1.953 |
| 2 | 18:31:28.512 | CDMA modem going to Traffic Channel Init State | 2.798 |
| 2 | 18:31:28.987 | CDMA modem going to Conversation State | 3.273 |
| 2 | 18:31:29.614 | PTT indicate ACTIVE | 3.900 |
| 2 | 18:31:31.028 | RTP based floor control | 5.314 |
| 1 | 18:31:31.043 | Page Received | 5.329 |
| 1 | 18:31:31.046 | CDMA modem going to Update Ovrhd Info State | 5.332 |
| 1 | 18:31:31.046 | CDMA modem going to Page Response State | 5.332 |
| 1 | 18:31:31.868 | CDMA modem going to Traffic Channel Init State | 6.154 |
| 1 | 18:31:32.424 | CDMA modem going to Conversation State | 6.710 |
| 1 | 18:31:34.580 | SIP_partyJoinedCB | 8.866 |
| 2 | 18:31:34.970 | Sending first set of pending RTP packets | 9.256 |
| 1 | 18:31:35.283 | Receive first set of RTP packets | 9.569 |
| 1 | 18:31:45.427 | Receive last RTP packet | 19.713 |
| 1 | 18:31:47.807 | Sending first set of RTP packets | 22.093 |
| 2 | 18:31:48.867 | Receive first set of RTP packets | 23.153 |
| 2 | 18:31:51.067 | Receive last RTP packet | 25.353 |

FIG. 2

| Mobile | LOG Time | Description | Relative Time (seconds) |
|---|---|---|---|
| 2 | 18:31:25.714 | first indication of call starting | 0.000 |
| 2 | 18:31:25.916 | PTT indicate that call started send INVITE | 0.202 |
| 2 | 18:31:27.632 | CDMA modem going to Update Ovrhd Info State | 1.918 |
| 2 | 18:31:27.667 | CDMA modem going to Origination Attempt State | 1.953 |
| 2 | 18:31:28.512 | CDMA modem going to Traffic Channel Init State | 2.798 |
| 2 | 18:31:28.987 | CDMA modem going to Conversation State | 3.273 |
| 2 | 18:31:29.614 | PTT indicate ACTIVE | 3.900 |
| 2 | 18:31:31.028 | RTP based floor control | 5.314 |
| 1 | 18:31:31.043 | Page Received | 5.329 |
| 1 | 18:31:31.046 | CDMA modem going to Update Ovrhd Info State | 5.332 |
| 1 | 18:31:31.046 | CDMA modem going to Page Response State | 5.332 |
| 1 | 18:31:31.868 | CDMA modem going to Traffic Channel Init State | 6.154 |
| 1 | 18:31:32.424 | CDMA modem going to Conversation State | 6.710 |
| 1 | 18:31:34.580 | SIP_partyJoinedCB | 8.866 |
| 2 | 18:31:34.970 | Sending first set of pending RTP packets | 9.256 |
| 1 | 18:31:35.283 | Receive first set of RTP packets | 9.569 |
| 1 | 18:31:45.427 | Receive last RTP packet | 19.713 |
| 1 | 18:31:47.807 | Sending first set of RTP packets | 22.093 |
| 2 | 18:31:48.867 | Receive first set of RTP packets | 23.153 |
| 2 | 18:31:51.067 | Receive last RTP packet | 25.353 |

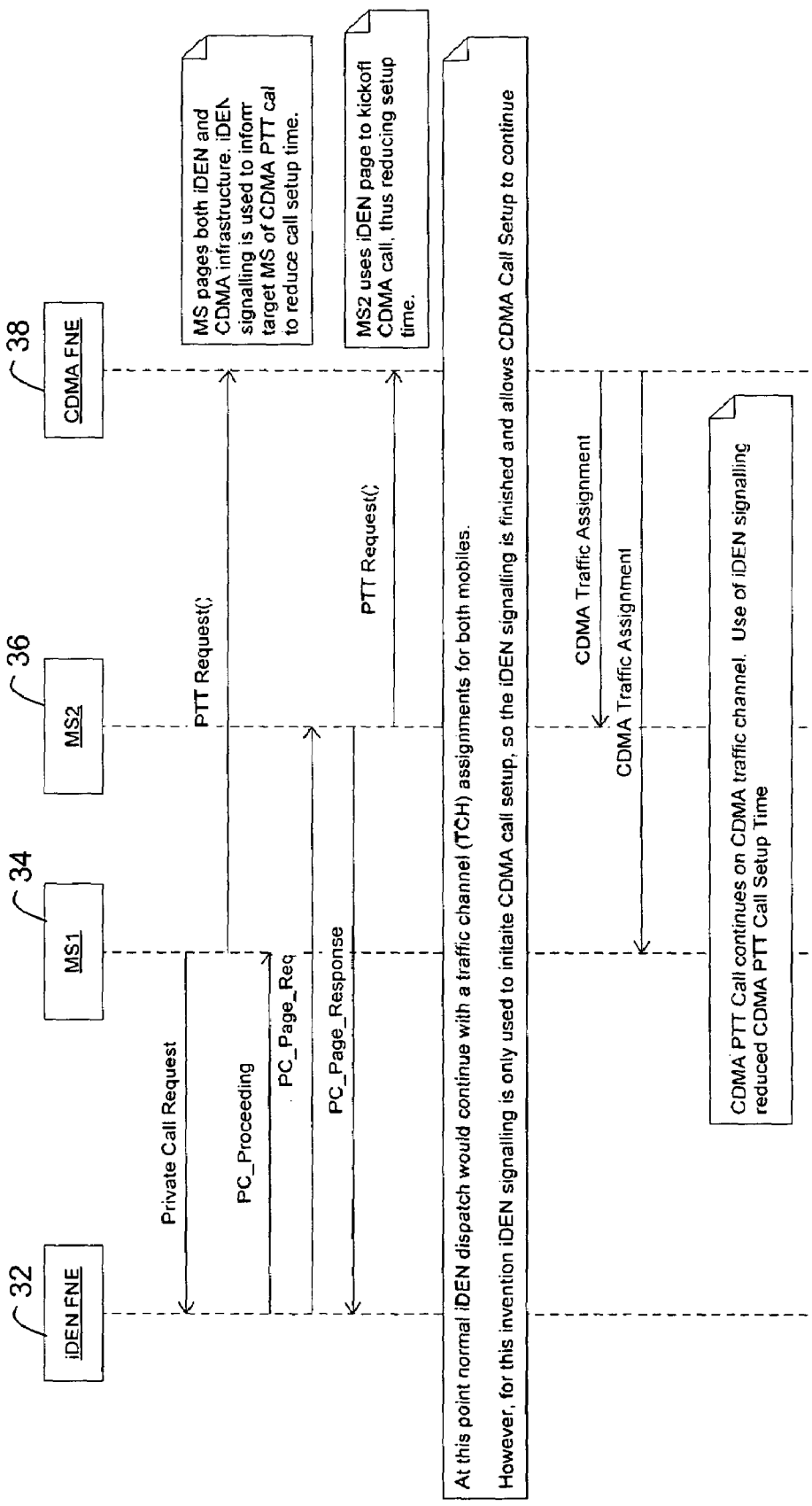

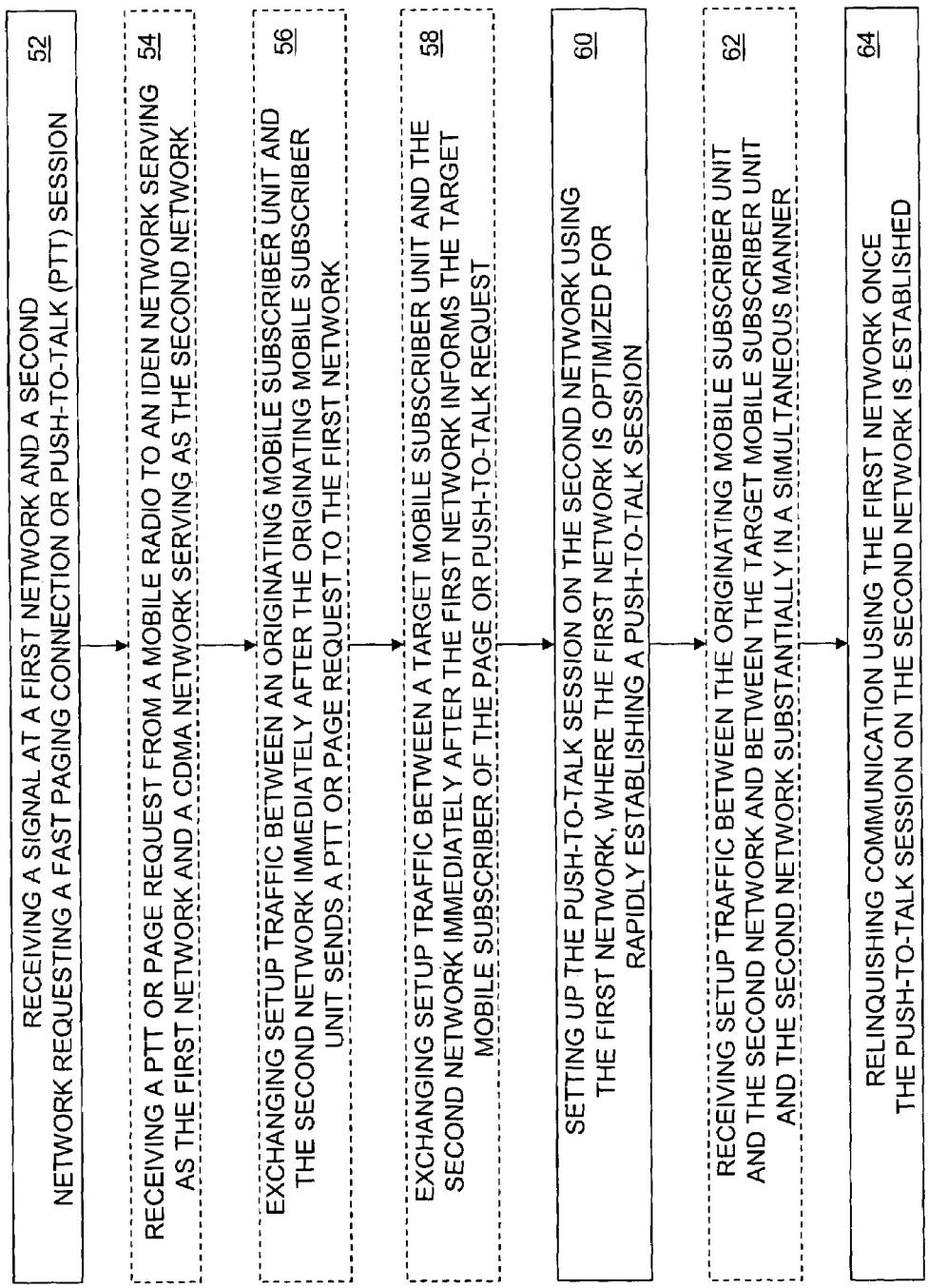

RAPID PUSH-TO-TALK CALL SETUP METHOD AND APPARATUS

FIELD OF THE INVENTION

This invention relates generally to mobile packet data networks, and more particularly to a method and system for rapid push-to-talk call setup.

BACKGROUND OF THE INVENTION

In wireless communication systems mobile units or devices are required to operate on batteries and these mobile units will go inactive (or dormant) on the radio frequency (RF) channels after a short period of inactivity of usage for data services, usually 30 to 60 seconds. Therefore, in push-to-talk calls using the wireless data services, both the originating and terminating mobile units must be transitioned to the active state (actually using RF resources) as part of the call setup prior to enabling the push-to-talk function. Once a mobile unit is in the active state, an RF channel has been established and the mobile unit is able to transmit and/or receive data. As known in the art, push-to-talk call applications include transmission of voice and associated signaling data, but advances in packet data networks extend push-to-talk call applications to include images, streaming video, text messaging, stored audio files, and other multi-media.

For typical push-to-talk call applications, the time required for transitioning an originating mobile unit from a dormant state to the active state can be greater than 3 seconds in current implementations. An equal or greater amount of time is required to transition the terminating mobile unit from the dormant to active state, including additional time to actually page the mobile device, as is known in the art. These times do not include transmission time over the air or call processing time required by the dispatch servers. As a result, for the push-to-talk function total delay times experienced by the originating mobile unit may be 10 seconds or greater.

With long call setup times, the advantages of the push-to-talk service as an instant communications method is diminished particularly with call setup times of 8 seconds or even longer which can make the service non-viable in the marketplace. For example, users would prefer to use cellular, rather than holding down the PTT button.

A similar problem exists for group calls in the push-to-talk mode. Call setup times may be even longer since there is a number of terminating mobile units to connect to the originating mobile unit. Although some of the processing time for each of the terminating or target mobile units may overlap, the total call setup time is likely to be even greater than the individual-to-individual call. Therefore, group calls pose an even greater problem for the push-to-talk function in a packet data network.

Accordingly, it would be highly desirable to have a method and system for substantially decreasing the call setup time for private calls and group calls within a push-to-talk packet data network configuration.

SUMMARY OF THE INVENTION

Embodiments in accordance with the present invention can reduce a push-to-talk call setup time on a first network such as a CDMA network by using an alternative network having a fast call setup. In the context of a cellular network, embodiments herein can be used for a Push over Cellular (PoC) system.

In a first embodiment of the present invention, a method of rapid push-to-talk call setup in a multi-wireless network environment can include the step of receiving a signal at a first network and a second network requesting a push-to-talk (PTT) session or a fast paging network connection and setting up the push-to-talk session or the fast paging network connection on the second network using the first network. Note, the first network is optimized for rapidly establishing a push-to-talk session. The method can further include the step of relinquishing communication using the first network once a push-to-talk session on the second network is established. The PTT request can come from a mobile radio to an iDEN network serving as the first network and a CDMA network serving as the second network. The method can further include exchanging setup traffic between an originating mobile subscriber unit and the second network immediately after the originating mobile subscriber unit sends a page request or a PTT request to the first network. The method can also include exchanging setup traffic between a target mobile subscriber unit and the second network immediately after the first network informs the target mobile subscriber of the page request or push-to-talk request. Receiving setup traffic between the originating mobile subscriber unit and the second network and between the target mobile subscriber unit and the second network can be done substantially in a simultaneous manner. In other words, the second network can assign traffic channels to an originating subscriber unit as well as to a target subscriber unit substantially in parallel. Using the techniques described above, a group PTT call session can be established. The set up of a group PTT call session can use a fast signaling paging channel on the first network to a target group of mobile subscriber units.

In a second embodiment of the present invention, a system of establishing a rapid PTT call setup in a multi-wireless network environment, can include a first wireless network such as an iDEN network optimized for rapid push-to-talk call setups in typically less than one second and a second wireless network such as a CDMA wireless network operatively coupled to the first wireless network. The system can further include a communication protocol among an originating mobile subscriber unit, a target mobile subscriber unit, the first wireless network, and the second wireless network, where the first wireless network and the second wireless network receive a request for a fast paging network connection or a PTT session and the fast paging network connection or the PTT session is set up on the second wireless network using the first wireless network. The system can further include a PTT server operatively coupled to the first wireless network and the second wireless network.

The system can include a communication protocol that further relinquishes communication using the first wireless network once a push-to-talk session on the second wireless network is established using the fast paging network connection. The communication protocol can further exchange setup traffic between the originating mobile subscriber unit and the second network immediately after the originating mobile subscriber unit sends a page request or PTT request to the first network and the communication protocol can also exchange setup traffic between the target mobile subscriber unit and the second wireless network immediately after the first wireless network informs the target mobile subscriber of the page request or PTT request. Note, the setup traffic between the originating mobile subscriber unit and the second wireless network and between the target mobile subscriber unit and the second wireless network can occur substantially in a simultaneous manner. In other words, the second wireless network assigns traffic channels to an originating subscriber unit and a target subscriber unit substantially in parallel. The communication protocol can also set up a group PTT session using a fast signaling paging channel on the first wireless network to a target group of mobile subscriber units.

Other embodiments, when configured in accordance with the inventive arrangements disclosed herein, can include a system for performing and a machine readable storage for causing a machine to perform the various processes and methods disclosed herein.

BRIEF DESCRIPTION OF THE DRAWINGS

FIG. 2 is an illustration of timing of a CDMA2000 1X system logging two CDMA phones with PTT capability.

FIG. 4 is another illustration of a communication protocol for setting up a rapid push-to-talk call session in a multi-wireless network environment in accordance with an embodiment of the present invention.

FIG. 5 is a flow chart illustrating a method of rapid push-to-talk call setup in a multi-wireless network environment in accordance with an embodiment of the present invention.

DETAILED DESCRIPTION OF THE DRAWINGS

Figure 1:
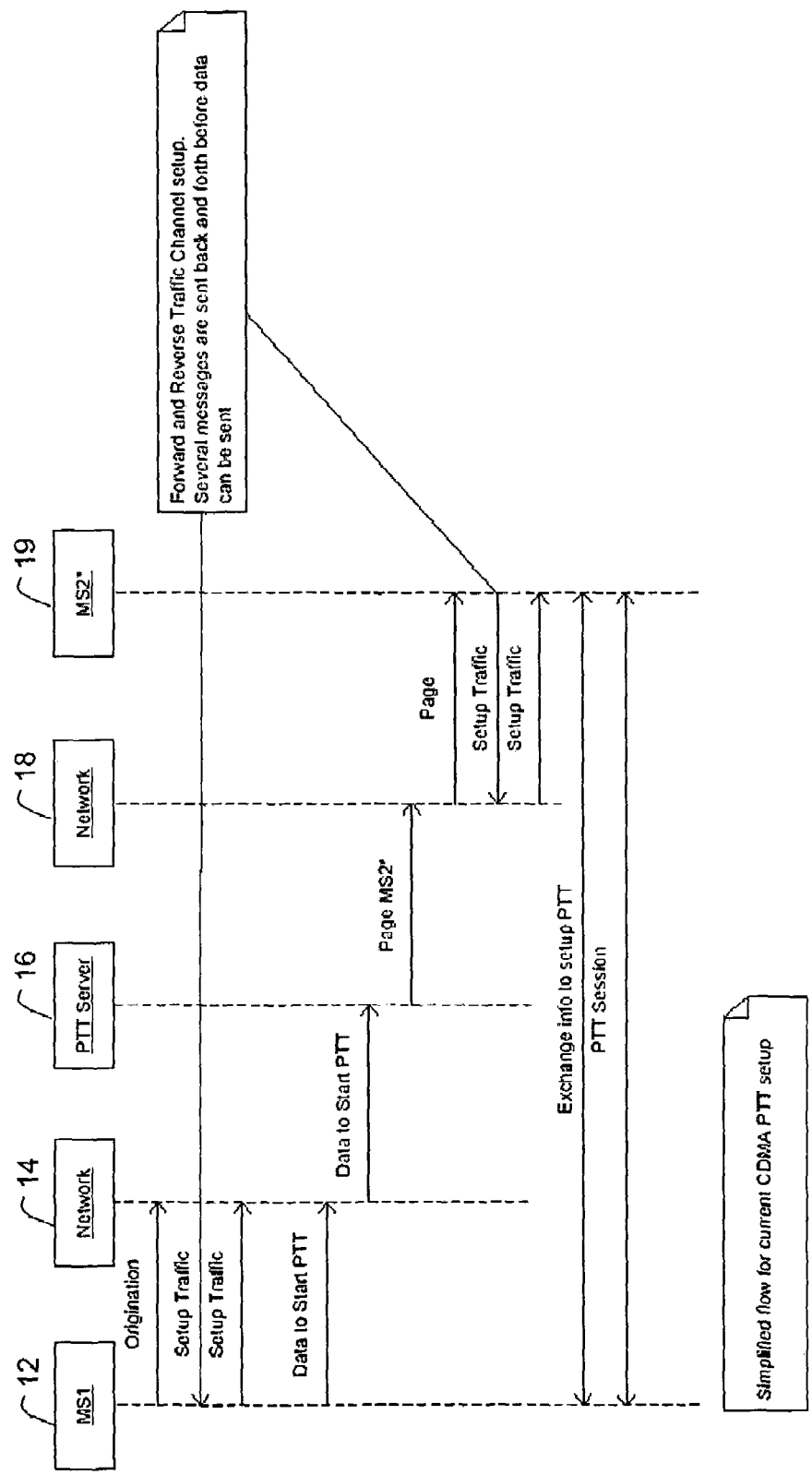
FIG. 1 is an illustration of an existing communication protocol for setting up a push-to-talk call session.

While the specification concludes with claims defining the features of embodiments of the invention that are regarded as novel, it is believed that the invention will be better understood from a consideration of the following description in conjunction with the figures, in which like reference numerals are carried forward.

A method and apparatus for reducing CDMA Push-To-Talk (PTT) Call Setup can incorporate the fast call set up systems used in alternate communication networks. Referring to FIG. 1, a diagram for a typical CDMA call setup is illustrated. An originating mobile subscriber unit (MS) 12 requests a PTT call or group call, and a network 14 responds by setting up a traffic channel. The originating MS's traffic channel request eventually reaches a PTT server 16, which then pages the target MSs 19 (note, a single MS is shown— in group calls other MSs in the group are paged in parallel) using network equipment 18. The target MS 19 is paged, responds to the page, and eventually a traffic channel is assigned using network 18. At this point, a PTT call or a group call voice can be delivered to the target MSs (19). Note that the call setup for the subscribers is done in a serial fashion. Much of the delay in establishing the call is due to the serial nature of the call setup. As will be noted in FIGS. 2 and 3 in embodiments of the present invention, the CDMA traffic channel assignment of the subscribers can be done in parallel and the paging done at faster intervals providing significant savings in call setup timing.

Referring to FIG. 2, timing taken in June 2005 on a CDMA2000 1X system logging two CDMA phones with PTT capability illustrates the following:

It takes greater than 3 seconds typical setup time for an Originating mobile to get to a traffic channel (TCH).

Paging delay: CDMA2000 paging time uses the concept of slot cycle indexes. The paging occurs on intervals on 1.28 seconds and follows the formula $T=2^i$. For example, for i=1 results in paging intervals of $1.28*2^1=2.56$ seconds. This means a delay of up to 2.56 seconds can occur before being received by the terminating subscriber.

Once the mobile terminating (MT) device receives the page, it takes ~1.5 seconds to come onto a traffic channel. Paging delay can also be up to 1.28 seconds depending on the slot cycle index.

From the time log in FIG. 2, the CDMA phones took 9.569 seconds from the initial PTT until data was received on the remote phone. If the call setup time for the terminating phone could be done in parallel with the originating phone, approximately 2-3 seconds could be eliminated from the setup time. This improvement would result in approximately 30% reduction in call setup time for this example.

Figure 3:
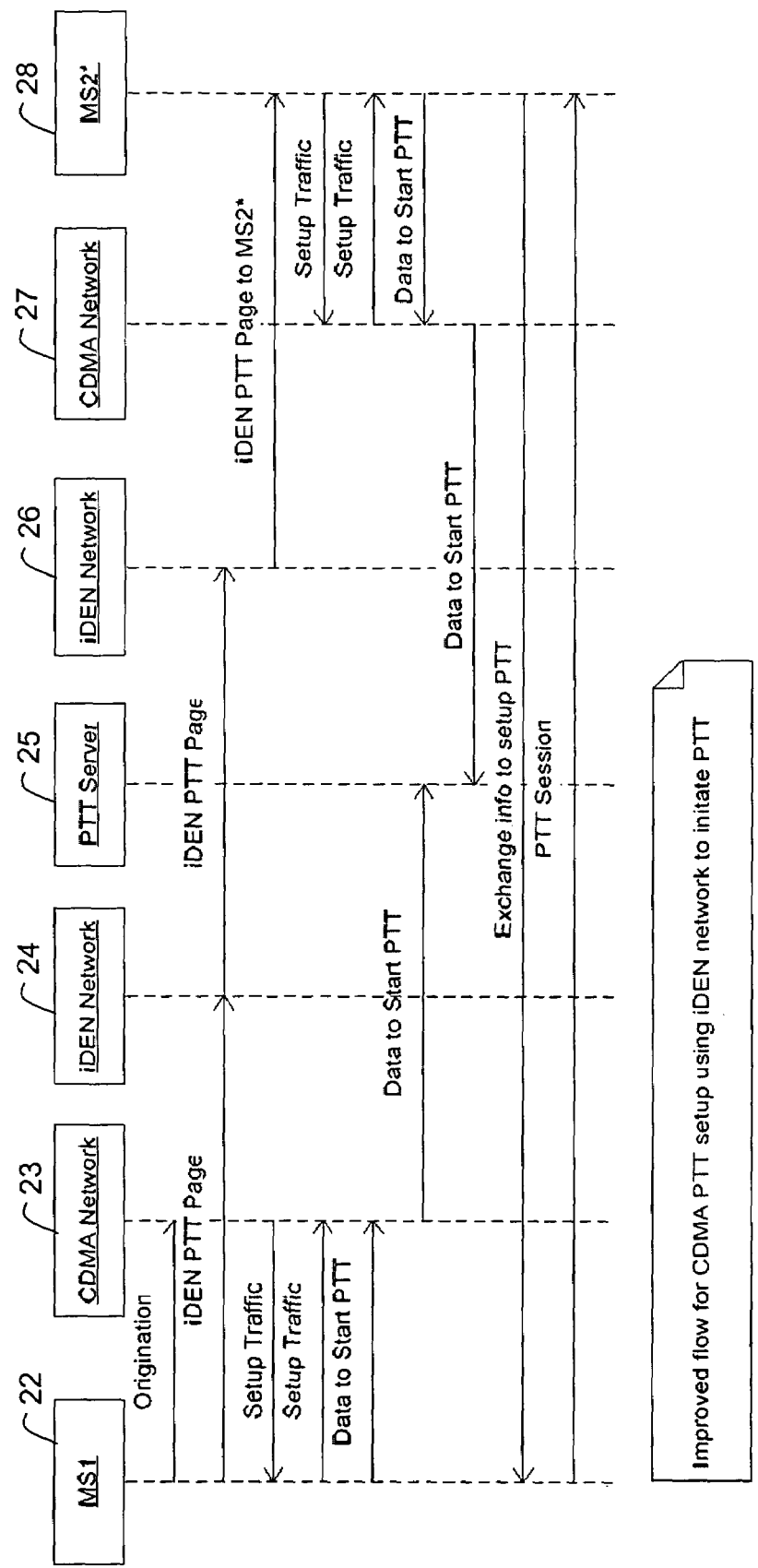
FIG. 3 is an illustration of a communication protocol for setting up a rapid push-to-talk call session in a multi-wireless network environment in accordance with an embodiment of the present invention.

Referring to FIG. 3, a timing diagram for communication system 20 illustrates an improvement in call setup times in accordance with an embodiment of the present invention. A first mobile subscriber (MS1) 22 begins a PTT call or group call request (Origination) to a CDMA network 23 as normal. In addition, a PTT call request or group call request is sent to an IDEN network 24 and 26 which pages the other subscriber(s) 28 in the group. (Note, simultaneous transmission of CDMA and iDEN messaging is contemplated for a dual mode CDMA/iDEN subscriber unit.

Since iDEN has a fast signaling/paging channel, the remote subscribers (28) receive the iDEN group page (or normal PTT page) quickly (typically within one second). Upon receiving the group page or PTT page, the remote subscribers 28 know that a group call is being requested, and respond accordingly. The remote subscriber(s) 28 will then initiate a CDMA session. Since the iDEN group page was delivered quickly, the remote subscribers can begin their CDMA session essentially in parallel with the initiating unit 22 rather than waiting for the CDMA network 23 and 27 to page and initiate their session. This is an improvement over the current CDMA call setup since the initiating and target subscribers (22 and 28) were essentially operating in series, and are now operating in parallel.

Additionally, the iDEN page delivery is significantly faster than CDMA2000's comparable paging delivery. iDEN dispatch paging occurs at 90 msec intervals, vs 2.56 sec intervals (using a Slot Cycle Index of 1). Assuming an average page delivery of ½ the interval time, iDEN's 45 msec average page delay is approximately 800 msec faster than CDMA's 1.28 sec average.

Note that some infrastructure changes from current arrangements may be required. With the proposed implementation both subscribers are requesting resources and a PTT server 25 can be modified to accept both requests from the originating subscriber 22 and the target subscriber(s) 28 as well as be modified to handle a PTT call or "group" call appropriately.

Referring to FIG. 4, an alternative timing diagram for a system 30 reveals a virtual parallel call setup environment using a first network 32 and a second network 38. The first network 32 can be optimized for fast PTT call setup such as an iDEN network or a CDMA EDVO network. The second network 38 can be a conventional CDMA network. An originating mobile subscriber (MS1) 34 can make a private call request to the first network 32 and make a corresponding PTT request to the second network 38. MS1 34 can page both IDEN and CDMA infrastructure where iDEN signaling can be used to inform a target mobile subscriber (MS2) 36 of the CDMA PTT call to reduce call setup time. The MS2 36 can use the iDEN page to kickoff the CDMA PTT call and thus reduce setup time. The first network 32 or IDEN network at this point can continue with normal dispatch services with traffic channel (TCH) assignments for both the originating mobile subscriber 34 and the target mobile subscriber 36. However, in accordance with an embodiment herein, the signaling for the first network 32 (iDEN) is only used to initiate the CDMA call setup, so the CDMA call setup continues without further IDEN resources since the iDEN signaling is finished. Thus, the CDMA PTT call continues on a CDMA traffic channel where the IDEN signaling reduced the CDMA PTT call setup time.

Referring to FIG. 5, a flow chart illustrating a method 50 of rapid push-to-talk call setup in a multi-wireless network environment. The method 50 can include the step 52 of receiving a signal at a first network and a second network requesting a push-to-talk (PTT) session. Optionally, step 52 can further include the step 54 of receiving a PTT request from a mobile radio to an iDEN network serving as the first network and a CDMA network serving as the second network. At optional step 56, setup traffic can be exchanged between an originating mobile subscriber unit and the second network immediately after the originating mobile subscriber unit sends a PTT request to the first network. At optional step 58, setup traffic can be exchanged between a target mobile subscriber unit and the second network immediately after the first network informs the target mobile subscriber of the push-to-talk request. The method 50 can further include the step 60 of setting up the push-to-talk session on the second network using the first network, where the first network is optimized for rapidly establishing a push-to-talk session. At step 62 setup traffic can be received between the originating mobile subscriber unit and the second network and between the target mobile subscriber unit and the second network substantially in a simultaneous manner. At step 64, the method 50 can further include the step of relinquishing communication using the first network once the push-to-talk session on the second network is established. In other words, the second network can assign traffic channels to an originating subscriber unit as well as to a target subscriber unit substantially in parallel. Using the techniques described above, a group PTT call session can be established. The set up of a group PTT call session can use a fast signaling paging channel on the first network to a target group of mobile subscriber units.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of rapid push-to-talk call setup in a multi-wireless network environment, comprising the steps of:
   receiving a signal requesting a fast paging network connection at both a first network and a second network, wherein the first network is optimized for rapidly establishing a push-to-talk session; and
   setting up the fast paging network connection on the second network using the first network, rather than waiting for the second network to initiate the fast paging network connection.

2. The method of claim 1, wherein the method further comprises the step of relinquishing communication using the first network once a push-to-talk session on the second network is established.

3. The method of claim 1, wherein the step of receiving comprises the step of receiving a push-to-talk request from a mobile radio at an iDEN network serving as the first network and a CDMA network serving as the second network.

4. The method of claim 1, wherein the method further comprises the step of exchanging setup traffic between an originating mobile subscriber unit and the second network immediately after the originating mobile subscriber unit sends a page request to the first network.

5. The method of claim 4, wherein the method further comprises the step of exchanging setup traffic between a target mobile subscriber unit and the second network immediately after the first network informs the target mobile subscriber of the page request.

6. The method of claim 1, wherein the method further comprises receiving setup traffic between an originating mobile subscriber unit and the second network and between a target mobile subscriber unit and the second network substantially simultaneously.

7. The method of claim 1, wherein the second network assigns traffic channels to an originating subscriber unit and a target subscriber unit substantially in parallel.

8. The method of claim 1, wherein the method further comprises the step of setting up a group push-to-talk session using a fast signaling paging channel on the first network to a target group of mobile subscriber units.

9. The method of claim 1, wherein the step of receiving comprises the step of receiving a push-to-talk request from a mobile radio at a CDMA EVDO network serving as the first network and a CDMA network serving as the second network.

10. A system of establishing a rapid push-to-talk call setup in a multi-wireless network environment, comprising:
    a first wireless network optimized for rapid push-to-talk call setups in typically less than one second;
    a second wireless network operatively coupled to the first wireless network;
    a communication protocol among an originating mobile subscriber unit, a target mobile subscriber unit, the first wireless network, and the second wireless network, wherein the first wireless network and the second wireless network receive a request for a fast paging network connection and the fast paging network connection is set up on the second wireless network using the first wireless network, rather than waiting for the second network to initiate the fast paging network connection.

11. The system of claim 10, wherein the system further comprises a push-to-talk server operatively coupled to the first wireless network and the second wireless network.

12. The system of claim 10, wherein the communication protocol further relinquishes communication using the first wireless network once a push-to-talk session on the second wireless network is established using the fast paging network connection.

13. The system of claim 10, wherein the first wireless network is an iDEN network and the second wireless network is a CDMA network.

14. The system of claim 10, wherein the communication protocol further exchanges setup traffic between the originating mobile subscriber unit and the second network immediately after the originating mobile subscriber unit sends a push-to-talk or page request to the first network.

15. The system of claim 14, wherein the communication protocol further exchanges setup traffic between the target mobile subscriber unit and the second wireless network immediately after the first wireless network informs the target mobile subscriber of the push-to-talk or page request.

16. The system of claim 10, wherein the communication protocol further receives setup traffic between the originating mobile subscriber unit and the second wireless network and between the target mobile subscriber unit and the second wireless network substantially simultaneously.

17. The system of claim 10, wherein the second wireless network assigns traffic channels to an originating subscriber unit and a target subscriber unit substantially in parallel.

18. The system of claim 10, wherein the communication protocol further sets up a group push-to-talk session using a fast signaling paging channel on the first wireless network to a target group of mobile subscriber units.

19. A machine-readable storage, having stored thereon a computer program having a plurality of code sections executable by a machine for causing the machine to perform the steps of:
  receive a signal at both a first network and a second network requesting a push-to-talk session or a fast paging network connection, wherein the first network is optimized for rapidly establishing a push-to-talk session; and
  set up the push-to-talk session or the fast paging network connection on the second network using the first network, rather than waiting for the second network to initiate the fast paging network connection.

20. The machine readable storage of claim 18, wherein the computer program further comprises a plurality of code sections for causing the machine to exchange setup traffic between an originating mobile subscriber unit and the second network immediately after the originating mobile subscriber unit sends a page request or a push-to-talk request to the first network.

21. The machine readable storage of claim 19, wherein the computer program further comprises a plurality of code sections for causing the machine to exchange setup traffic between a target mobile subscriber unit and the second network immediately after the first network informs the target mobile subscriber of the page request or the push-to-talk request.

* * * * *